United States Patent
Hutchings et al.

(10) Patent No.: US 10,968,123 B2
(45) Date of Patent: Apr. 6, 2021

(54) CATALYTIC WATER TREATMENT WITH IN-SITU PRODUCTION OF HYDROGEN PEROXIDE

(71) Applicant: UNIVERSITY COLLEGE CARDIFF CONSULTANTS LTD, South Glamorgan (GB)

(72) Inventors: Graham John Hutchings, Northallerton (GB); Simon James Freakley, Totterdown (GB); Jennifer Edwards, Bonvilston Cardiff (GB)

(73) Assignee: UNIVERSITY COLLEGE CARDIFF CONSULTANTS LTD, South Glamorgan (GB)

( * ) Notice: Subject to any disclaimer, the term of this patent is extended or adjusted under 35 U.S.C. 154(b) by 139 days.

(21) Appl. No.: 16/307,299

(22) PCT Filed: Jun. 6, 2017

(86) PCT No.: PCT/GB2017/051627
§ 371 (c)(1),
(2) Date: Dec. 5, 2018

(87) PCT Pub. No.: WO2017/212241
PCT Pub. Date: Dec. 14, 2017

(65) Prior Publication Data
US 2019/0135664 A1 May 9, 2019

(30) Foreign Application Priority Data
Jun. 6, 2016 (GB) .................................. 1609851

(51) Int. Cl.
*B01J 21/06* (2006.01)
*B01J 23/44* (2006.01)
(Continued)

(52) U.S. Cl.
CPC ............... *C02F 1/725* (2013.01); *B01J 23/52* (2013.01); *B01J 23/626* (2013.01); *B01J 37/088* (2013.01);
(Continued)

(58) Field of Classification Search
CPC .......... C02F 1/281; C02F 1/288; C02F 1/461; C02F 1/4672; C02F 1/685; C02F 1/70;
(Continued)

(56) References Cited

U.S. PATENT DOCUMENTS

| 6,117,337 A | 9/2000 | Gonzalez-Martin et al. |
| 6,117,409 A | 9/2000 | Bertsch-Frank et al. |

(Continued)

FOREIGN PATENT DOCUMENTS

| CN | 102976472 A | 3/2013 |
| CZ | 305477 B6 | 12/2015 |

(Continued)

OTHER PUBLICATIONS

Machine Translation of KR 10-2003-0048270 (obtained from KIPO Jun. 2020) (Year: 2003).*

(Continued)

*Primary Examiner* — Lucas A Stelling
(74) *Attorney, Agent, or Firm* — Squire Patton Boggs (US) LLP

(57) ABSTRACT

This application relates to a water treatment process. The process comprises contacting contaminated water with a catalyst, introducing hydrogen and an oxygen-containing gas into the contaminated water, and reacting hydrogen and oxygen in the presence of the catalyst and the contaminated water.

15 Claims, 6 Drawing Sheets

*E. coli* cell density after a single pass through the microreactor with and without a catalyst present. Each gas atmosphere is diluted in $CO_2$.

(51) Int. Cl.
| | |
|---|---|
| *B01J 23/52* | (2006.01) |
| *B01J 23/62* | (2006.01) |
| *B01J 37/08* | (2006.01) |
| *B01J 37/18* | (2006.01) |
| *C01B 15/029* | (2006.01) |
| *C02F 1/461* | (2006.01) |
| *C02F 1/467* | (2006.01) |
| *C25B 1/04* | (2021.01) |
| *C02F 1/72* | (2006.01) |
| *C02F 103/00* | (2006.01) |
| *C02F 103/08* | (2006.01) |

(52) U.S. Cl.
CPC ............ *B01J 37/18* (2013.01); *C01B 15/029* (2013.01); *C02F 1/4672* (2013.01); *C25B 1/04* (2013.01); *B01J 21/063* (2013.01); *B01J 23/44* (2013.01); *C02F 1/461* (2013.01); *C02F 2103/002* (2013.01); *C02F 2103/005* (2013.01); *C02F 2103/007* (2013.01); *C02F 2103/08* (2013.01); *C02F 2303/04* (2013.01); *C02F 2305/023* (2013.01)

(58) Field of Classification Search
CPC .. C02F 1/705; C02F 1/72; C02F 1/722; C02F 1/725; C02F 2103/002; C02F 2103/005; C02F 2103/007; C02F 2103/08; C02F 2303/04; C02F 2305/023; B01J 21/063; B01J 23/44; B01J 23/52; B01J 23/626; B01J 37/088; B01J 37/18; C01B 15/029; C25B 1/04

See application file for complete search history.

(56) References Cited

U.S. PATENT DOCUMENTS

2006/0102492 A1  5/2006  Corradi et al.
2007/0272547 A1  11/2007  Vanden Bussche et al.

FOREIGN PATENT DOCUMENTS

| JP | H04166215 A | 6/1992 |
| JP | 2015-223567 A | 12/2015 |
| KR | 2003-0048270 A | 6/2003 |
| WO | WO 2011/114105 A1 | 9/2011 |

OTHER PUBLICATIONS

Machine Translation of JP 2015-223567A (obtained from JPO Jun. 2020) (Year: 2015).*

International Search Report and Written Opinion of the International Searching Authority of PCT/GB2017/051627 dated Jul. 14, 2017, 11 pages.

Communication pursuant to Article 94(3) for EP application No. 17728642.4 dated Feb. 27, 2020; 8 pages.

Mededovic et al., "The role of platinum as the high voltage electrode in the enhancement of Fenton's reaction in liquid phase electrical discharge", Applied Catalysis B: Environmental, 2007, vol. 72, pp. 342-350.

* cited by examiner

Figure 1 – *E. coli* cell density after a single pass through the microreactor with and without a catalyst present. Each gas atmosphere is diluted in $CO_2$.
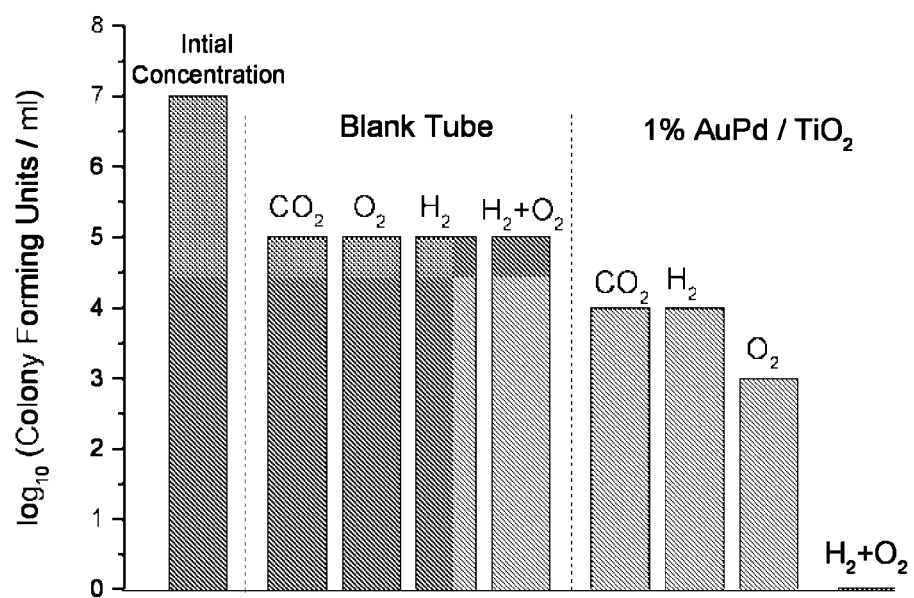

Figure 2 – Efficiency of inactivation of *E. coli* from solutions of increasing cell density during a single pass through the microreactor.
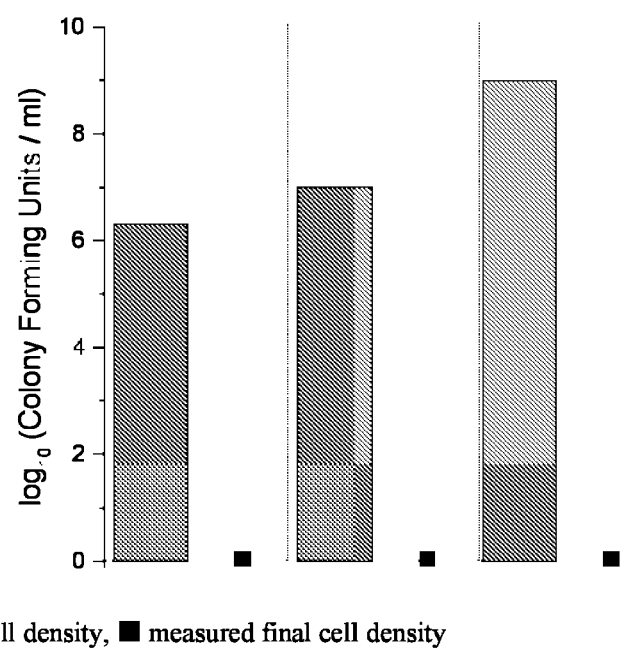
Red bars initial cell density, ■ measured final cell density

Figure 3 – Efficiency of inactivation of *E. coli* using 2% H₂/Air and 1 wt% Au-Pd/TiO₂ catalyst at a) various pressures and b) various total flow rates during a single pass through the microreactor.
a)
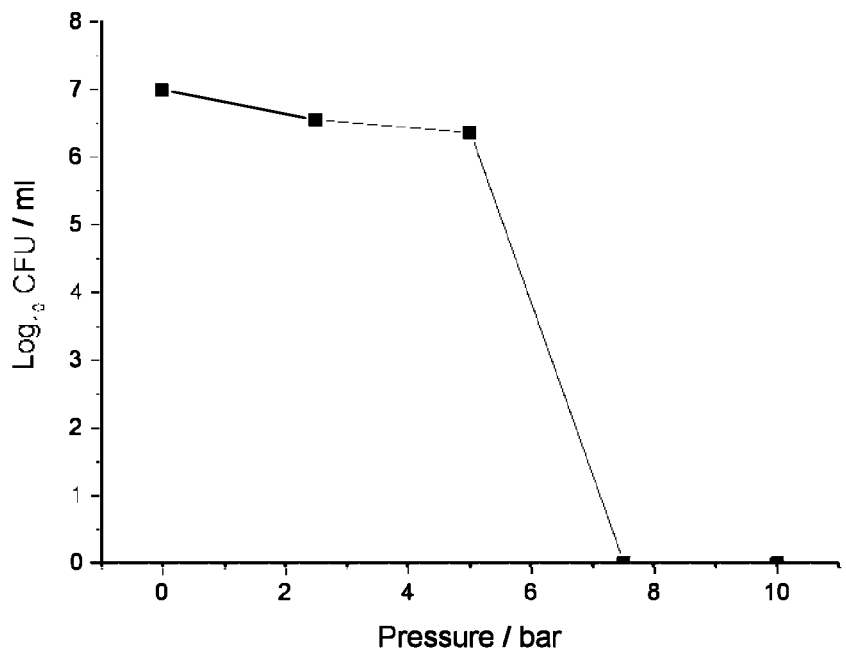
b)
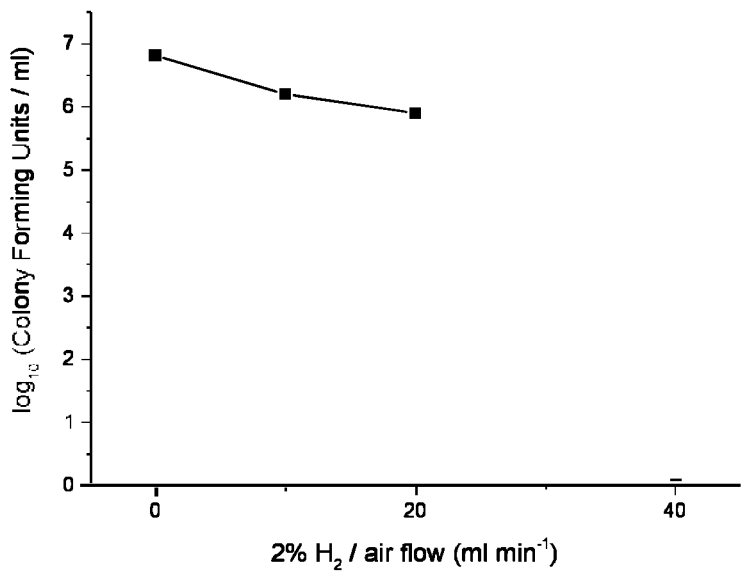
Reaction Conditions: 120 mg catalyst (1 wt% Au-Pd/TiO₂), liquid flow rate 0.2 mL/min, 2% H₂/air, 2 °C, a) 42 ml min⁻¹ gas flow at various pressure b) 10 bar 2% H₂/air at various gas flow rates.

Figure 4 – Efficiency of inactivation of *E. coli* using pre-formed $H_2O_2$ and *in situ* $H_2O_2$ under 10 bar pressure of air in the presence of catalyst while passing through the reactor system.
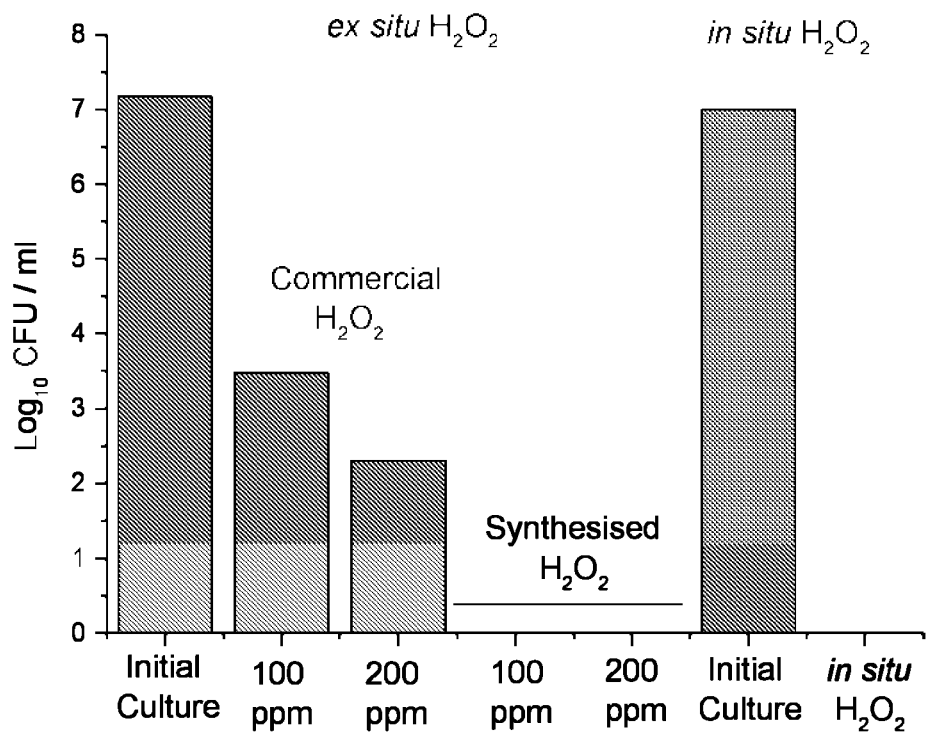
120 mg catalyst (1 wt% Au-Pd/TiO$_2$), liquid flow rate 0.2 mL/min, 42 ml min$^{-1}$ (*ex situ* – synthetic air, *in situ* 2% H$_2$ in air), 2 °C, 10 bar

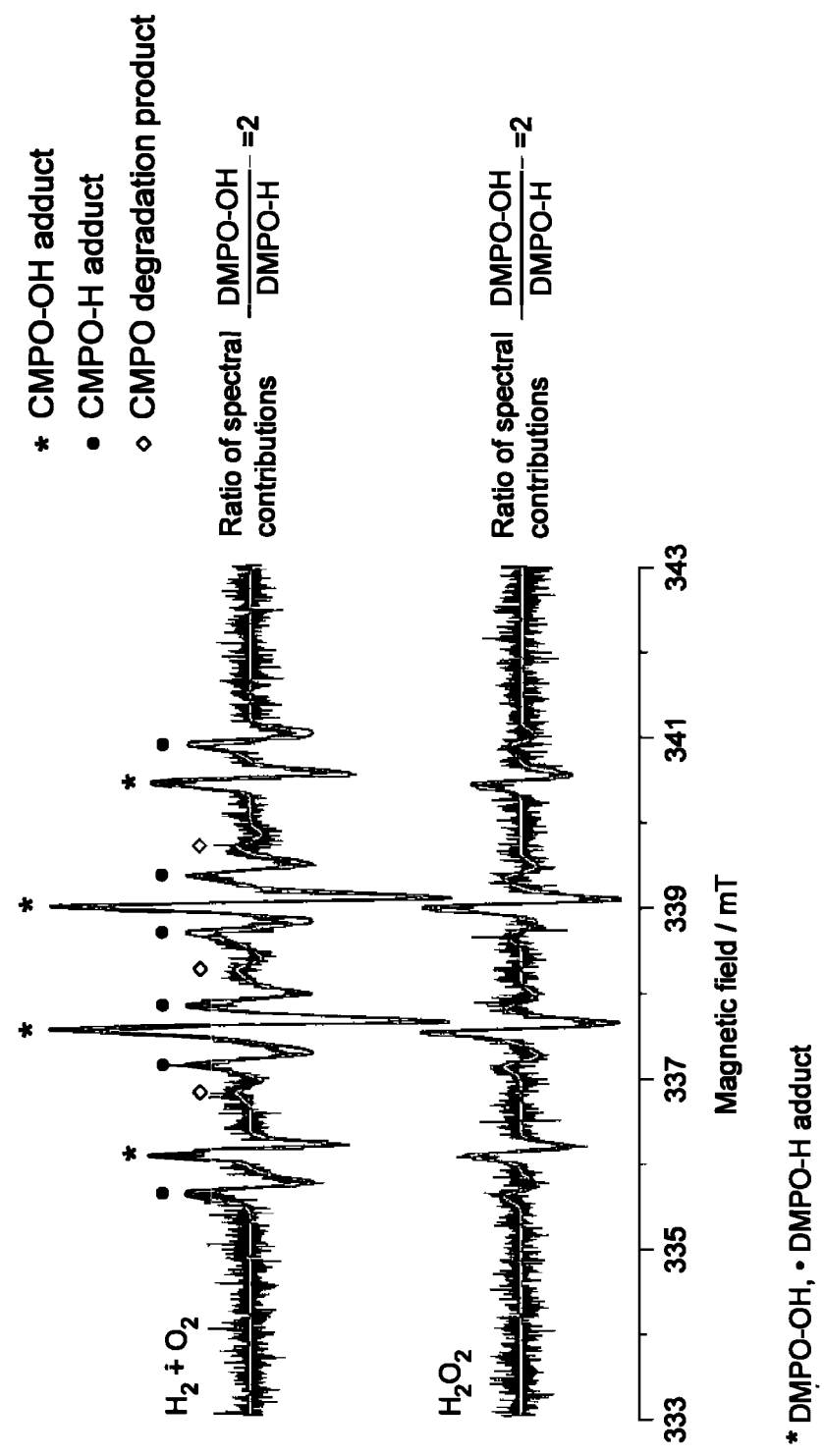
Figure 5 - EPR spectoscopy of the radicals formed while commercial $H_2O_2$ and $H_2 + O_2$ are passed over the catalyst.

Apparatus:

- a reactor containing a catalyst to generate radical species, including hydrogen radicals, by a reaction in the presence of hydrogen and oxygen, wherein the catalyst comprises palladium and gold or palladium and tin

- inlet for introducing wastewater into the reactor

- an outlet for withdrawing treated water from the reactor

- a source of hydrogen and an oxygen-containing gas, wherein the source is for introducing hydrogen and an oxygen-containing gas into the wastewater in the reactor

- may in some examples have an electrolyser

CATALYTIC WATER TREATMENT WITH IN-SITU PRODUCTION OF HYDROGEN PEROXIDE

CROSS-REFERENCE TO RELATED APPLICATIONS

This application is a National Stage filing under 35 U.S.C. § 371 of International Patent Application No. PCT/GB2017/051627, filed Jun. 6, 2017, and entitled "CATALYTIC WATER TREATMENT WITH IN-SITU PRODUCTION OF HYDROGEN PEROXIDE," which claims the benefit of priority to GB Application No. 1609851.9, filed Jun. 6, 2016, both applications of which are herein incorporated by reference in their entirety for all purposes.

This invention relates to a process for treating contaminated water. The invention also relates to a water treatment apparatus.

BACKGROUND

There is an increasing demand on the availability of clean water as a natural resource throughout the world. Access to clean water is a requirement in all areas of society, ranging from domestic dwellings and agriculture to disaster areas and areas with a high risk of drought. With an increasing population, more strain is being placed on the availability of clean water in many areas around the world.

A large amount of contaminated water is generated by each household every day. Some of this wastewater originates from toilets and may be subject to faecal contamination. This wastewater is classified as black water and is generally treated in a sewage treatment facility. On the other hand, wastewater from all other sources (e.g. from sinks, baths, showers, kitchen, harvested rain water and laundry) is classified as greywater. By treating this mildly contaminated greywater, it can be re-used for applications such as toilet flushing, landscape and agricultural irrigation.

Various methods for treating greywater are known. For example, the greywater can be filtered and treated with chlorine to prevent bacterial growth. Other methods include UV treatment, and treating the greywater with hydrogen peroxide in combination with UV treatment.

BRIEF DESCRIPTION OF THE DRAWINGS

Embodiments of the invention are further described hereinafter with reference to the accompanying drawings, in which:

FIGS. 1 and 2 show the observed *Esherichia coli* cell density after one pass through a reactor operated as described in Example 2;

FIGS. 3*a* and 3*b* show the effect of total pressure and gas flow rates on *Esherichia coli* cell density (see Example 3);

FIG. 4 compares the efficacy of using pre-formed $H_2O_2$ as a disinfectant with the use of an in-situ disinfection method according to Example 4; and FIG. 5 shows the results of EPR spectroscopy on a solution containing commercial hydrogen peroxide and a solution containing hydrogen and oxygen as they solutions are passed over an AuPd catalyst (see Example 5).

FIG. 6 is a schematic drawing of a wastewater treatment apparatus.

DESCRIPTION

According to a first aspect of the present invention, there is provided a water treatment process comprising contacting contaminated water with a catalyst; introducing hydrogen and an oxygen-containing gas into the contaminated water; and reacting hydrogen and oxygen in the presence of the catalyst and the contaminated water.

According to a second aspect of the invention, there is provided a water treatment apparatus comprising
 a reactor containing a catalyst,
 an inlet for introducing contaminated water into the reactor,
 an outlet for withdrawing treated water from the reactor, and
 means for introducing hydrogen and an oxygen-containing gas into the contaminated water treated in the reactor.

The contaminated water may be wastewater, for example, greywater. Other examples of contaminated water that may be treated using the process of the present disclosure include river water, rain water, seawater and/or brackish water. In a preferred embodiment, the process and apparatus described herein may be used to treat greywater. For example, the process and apparatus may be used to treat greywater from a domestic or commercial sources to produce treated water that can be stored and recycled for use (e.g. for toilet flushing, landscape and agricultural irrigation, washing and cleaning).

In an alternative embodiment, the process and apparatus described herein may be used as part of a water purification process, for example, as a disinfection step. Examples of purification processes include wastewater treatment, desalination and sewage treatment processes.

By reacting hydrogen and oxygen in the presence of the catalyst and the contaminated water, oxidative species can be generated in situ to reduce the level of biological contaminants in the contaminated water. Examples of oxidative species include hydrogen peroxide and free radicals e.g. generated during or as a result of the reaction of hydrogen and oxygen in the presence of the catalyst. Examples of radicals that may provide an oxidative effect include those formed during formation or upon decomposition of hydrogen peroxide e.g. hydroxyl and hydroperoxy species. These radicals may have a disinfectant or antimicrobial effect.

Without wishing to be bound by any theory, the reaction between hydrogen and oxygen in the catalyst may produce effective amounts of oxidative species, for example, hydrogen peroxide, which perform an antimicrobial function. This is surprising as prior art methods of direct hydrogen peroxide production generally require the reaction between hydrogen and oxygen to be carried out in the presence of an organic solvent medium (e.g. methanol) to generate hydrogen peroxide in appreciable amounts. In the present invention, the oxidative species (e.g. hydrogen peroxide and/or radicals) are generated in situ. Accordingly, their local concentration at the catalyst's surface may be high, enhancing their antimicrobial effect on contaminants in the surrounding contaminated water medium. The in situ generation of oxidative species (e.g. radicals) also avoids the need for storing pre-formed hydrogen peroxide. Hydrogen peroxide needs to be stabilised with stabilising agents when stored and this reduces its potency as an oxidising agent. By generating hydrogen peroxide in situ, a disinfectant effect can be achieved without the need for stabilisation; the potency of the antimicrobial effect is thus enhanced.

In a preferred embodiment, hydrogen and oxygen react in the presence of the catalyst and contaminated water to generate radical species in situ, which reduce the levels of biological contaminants in the contaminated water. These oxidative radical species may include radical species that are formed on route to the formation of hydrogen peroxide and/or are generated as a result of the decomposition of hydrogen peroxide in the presence of the catalyst. Examples of radical species include hydrogen radicals and oxygen-containing radicals. In a preferred embodiment, the radical species include hydrogen radicals. These hydrogen radicals (H.) may be formed on route to the formation of hydrogen peroxide in the presence of the catalyst and/or as a result of the decomposition of any hydrogen peroxide generated in the presence of the catalyst.

Without being bound by any theory, it is believed that, by reacting hydrogen and oxygen in the presence of the catalyst and contaminated water, a greater flux of radical species (e.g. hydrogen radicals) can be achieved. Such species can react with contaminants in the water, thereby providing an antimicrobial effect.

Catalyst

The catalyst employed in the present invention may be any catalyst that is suitable for the direct synthesis of hydrogen peroxide. Such catalysts are well-known and described in, for example, WO 2011/051642, WO 2015/022548 and WO 2012/171892.

Suitable catalysts comprise at least one metal, for example, two or more metals. Preferably, the catalyst is a bimetallic catalyst. Suitable metals include transition metals, for example, palladium, platinum and gold. In one embodiment, the catalyst comprises at least one of palladium, platinum, and gold. Preferably, the catalyst comprises two of palladium, platinum, and gold. For example, the catalyst may comprise an alloy of two or more of these metals. In a preferred embodiment, the catalyst comprises palladium and gold. The catalyst may comprise an alloy of palladium and gold. In one embodiment, the catalyst comprises a transition metal, for example, palladium, in combination with a non-transition metal, for example, tin.

The catalyst may be a supported catalyst. For example, the catalyst may comprise at least one metal deposited on a support. The total amount of metal in the catalyst may be less than about 20 wt % of the catalyst, for example, less than about 10 wt. % of the catalyst, or less than about 8 wt. % of the total weight of the catalyst. In certain embodiments, the total amount of metal in the catalyst may be greater than about 0.01 wt % of the catalyst, for example, greater than about 0.1 wt %, or greater than about 0.5 wt % of the catalyst. In certain embodiments, the total amount of metal in the catalyst may be 0.01 to 20 wt %, for example, 0.1 to 10 wt %, or 0.5 to 8 wt % of the total weight of the catalyst. In some embodiments, the total amount of metal in the catalyst may be 0.01 to 5 wt %, for example, 0.1 to 4 wt %, or 0.5 to 3 wt % of the total weight of the catalyst.

In a preferred embodiment, the catalyst comprises palladium and gold. The total amount of palladium and gold may be less than about 20 wt % of the catalyst, for example, less than about 10 wt. % of the catalyst, or less than about 8 wt. % of the total weight of the catalyst. In certain embodiments, the total amount of palladium and gold in the catalyst may be greater than about 0.01 wt % of the catalyst, for example, greater than about 0.1 wt %, or greater than about 0.5 wt % of the catalyst. In certain embodiments, the total amount of palladium and gold in the catalyst may be 0.01 to 20 wt %, for example, 0.1 to 10 wt %, or 0.5 to 8 wt % of the total weight of the catalyst. In some embodiments, the total amount of palladium and gold in the catalyst may be 0.01 to 5 wt %, for example, 0.1 to 4 wt %, or 0.5 to 3 wt % of the total weight of the catalyst. In a preferred embodiment, the total amount of palladium and gold is 1 to 2 wt % based on the total weight of the catalyst.

Where two metals are used in the catalyst, the ratio of the first metal to the second metal may be 100:1 to 1:100. In some embodiments, the first metal and the second metal may be transition metals. In other embodiments, the first metal may be tin and the second metal, for example, palladium. In one embodiment, where the catalyst comprises palladium and gold, the ratio of palladium to gold may be 8:1 to about 1:8, for example, from about 6:1 to about 1:6, or from about 5:1 to about 1:5, or from about 4:1 to about 1:4, or from about 3:1 to about 1:3, or from about 2:1 to about 1:2, or from about 1.5:1 to about 1:1.5, or about 1:1. Where two metals are used in the catalyst, the metals may be deposited on the support as an alloy.

As mentioned above, the catalyst may be supported. In certain embodiments, the catalyst support is an organic or inorganic support, for example, catalyst support selected from the group consisting of carbon supports, oxide supports and silicate supports, for example, from $SiO_2$, $TiO_2$, $Al_2O_3$, $CeO_2$, $Nb_2O_5$, $W_2O_3$, $ZrO_2$, $Fe_2O_3$, silica-alumina, molecular sieves and zeolites, and mixtures thereof. Suitable carbon supports are graphite, carbon black, glassy carbon, activated carbon, highly orientated pyrolytic graphite, single-walled and multi-walled carbon nanotubes. In certain embodiments, the catalyst support comprises or is an oxide support, for example, an oxide support selected from $SiO_2$, $TiO_2$, $Al_2O_3$, $CeO_2$, $Nb_2O_5$, $W_2O_3$, $ZrO_2$, $Fe_2O_3$ and mixtures thereof. In certain embodiments, the catalyst support is an acidic catalyst support. Acidic catalyst supports include, for example, niobic acid support, heteropolyacid-based support, acid-treated carbon support, sulfated zirconia/silica support, and a support comprising an oxide other than zirconium oxide (e.g., silica) and a precipitate layer of zirconium oxide. Heteropolyacid supports include supports of the formula $CsxH_{3-x}PW_{12}O_4o$, where x is from about 2.0 to about 2.9, which may be prepared by the addition of a Cs source, such as $CsNO_3$, to aqueous $H_3PW_{12}O_{40}$. In an advantageous embodiment, the catalyst support comprises or is $SiO_2$. In another advantageous embodiment, the catalyst support comprises or is $TiO_2$. In certain embodiments, the catalyst does not comprise carbon supports. In certain embodiments, the catalyst does not include a heteropolyacid support.

The catalyst support may comprise at least about 60 wt. % of the catalyst, based on the total weight of the catalyst, for example, at least about 70 wt. % of the catalyst, or at least about 80 wt. % of the catalyst, or at least about 85 wt. % of the catalyst, or at least about 90 wt. of the catalyst, or at least about 91 wt. % of the catalyst, or at least about 92 wt. % of the catalyst, or at least about 93 wt. % of the catalyst, or at least about 94 wt. % of the catalyst, or equal to or greater than about 95 wt. % of the catalyst. In certain embodiments, the catalyst support comprises from about 60 wt. % to up to but not including 100 wt % of the catalyst, for example, to about 99 wt. % of the catalyst. In some examples, the support forms from about 70 wt. % to up to but not including 100 wt % of the catalyst, or from about 80 wt. % to about 99 wt. % of the catalyst.

In a preferred embodiment, the catalyst comprises palladium and gold supported on an oxide support, for example, silica, silicate or $TiO_2$ support. The total amount of palladium and gold on the catalyst may be 0.01 to 5 wt %, for example, 0.1 to 4 wt %, or 0.5 to 3 wt % of the total weight of the catalyst. In a preferred embodiment, the total amount of palladium and gold is 1 to 2 wt % based on the total weight of the catalyst. The ratio of palladium to gold may be about 8:1 to about 1:8, for example, from about 6:1 to about 1:6, or from about 5:1 to about 1:5, or from about 4:1 to about 1:4, or from about 3:1 to about 1:3, or from about 2:1 to about 1:2, or from about 1.5:1 to about 1:1.5, or about 1:1. The palladium and gold may form an alloy on the support.

The catalyst may be prepared by any suitable preparative method, preferably starting from suitable metal precursors. For example, the metal may be deposited onto the catalyst support in the form of metal oxides or metal ions, e.g., metal salt, by any known method to form a catalyst precursor. Where two metals are used (e.g. palladium and gold), the metals may be deposited simultaneously or sequentially, advantageously simultaneously. After deposition of the metal precursors onto the catalyst support, a catalyst precursor may be recovered by any suitable separation method, such as evaporation, filtration, decantation and/or centrifugation. The recovered catalyst precursor may be washed and dried, for example, at a temperature of between about 50° C. and 150° C., typically greater than about 100° C., for example, greater than about 105° C., and typically, less than about 130° C., for example, less than about 120° C., e.g., a temperature of from about 105° C. to about 115° C. Drying may be conducted over a suitable period of time. The catalyst precursor may then be transformed into the corresponding catalyst via at least one of a heat treatment, reductive treatment, e.g., chemical reduction in the presence of a reducing agent, or electrochemical reduction. Heat treatment may be conducted a temperature of from about 250° C. to about 600° C., or from about 300° C. to about 550° C., or from about 350° C. to about 550° C., or from about 400° C. to about 550° C., or from about 450° C. to about 550° C. Heat treatment may be conducted under any type of atmosphere such as, for example, oxygen containing atmosphere, inert atmosphere or reducing atmosphere. In certain embodiments, the heat treatment may be conducted under air, oxygen, nitrogen, argon, hydrogen or mixtures thereof.

Reactor

Any suitable reactor may be employed in the present invention. For example, a stirred reactor, such as an autoclave equipped with stirring means, a loop reactor or a tube reactor. The process may be conducted batch-wise, continuously or semi-continuously. The process is preferably carried out continuously. The catalyst may be in the reactor as a fixed bed or fluidized bed.

The reactor includes an inlet for introducing contaminated water into the reactor, and an outlet for withdrawing treated water from the reactor. The inlet may be coupled to a source of contaminated water, for example, greywater from household or commercial waste. The outlet may be coupled to a storage unit or tank, for example, for storing treated water for re-use in, for instance, cleaning, washing, toilet flushing, landscape or agricultural irrigation (see below). Alternatively, the inlet may be coupled to a source of water that has been treated or is being treated as part of a water treatment process, such as a desalination process. The outlet may be coupled to a storage tank or further downstream water treatment unit (s).

The contaminated water may be introduced into the reactor continuously and the treated stream may be removed from the reactor continuously. A portion of the treated stream may be recycled to the reactor.

As described above, hydrogen and an oxygen-containing gas are introduced into the reactor, where the gas flows into contaminated water contained in the reactor. The hydrogen and oxygen-containing gas may be introduced by feeding (e.g. continuously) the gases through water present in the reactor. Alternatively, the gases may be introduced into the water upstream of the reactor inlet. The hydrogen gas and/or oxygen-containing gas may be introduced continuously e.g. in admixture with a suitable diluent. Suitable diluents include carbon dioxide. Carbon dioxide may also be desirable as it may dissolve in the contaminated water to form carbonic acid, which may have a stabilizing effect on any oxidative species produced upon contact with the catalyst. In a preferred embodiment, the hydrogen gas is introduced in admixture with air, which acts as a source of oxygen and as a diluent.

In a preferred embodiment, an electrolyser is used in combination with the reactor. The electrolyser may be in fluid communication with the reactor. According to one embodiment, the water treatment apparatus comprises a reactor as described herein and an electrolyser. The electrolyser may be used to produce the hydrogen that is fed into the reactor. Hydrogen may be produced by electrolysing water. This may be water (e.g. clean water) from a separate source. Alternatively, the water may be contaminated water, for example, a portion of the contaminated water that is fed into the reactor. In yet another alternative, a portion of the treated (e.g. disinfected) water produced in the reactor is withdrawn and fed to the electrolyser.

In one embodiment, a portion of water passing through the electrolyser is recycled.

Reaction Conditions

As described above, the process of the present invention involves the reaction between hydrogen and oxygen in the presence of the catalyst and contaminated water. This reaction generates oxidative species in situ to reduce the level of biological contaminants in the contaminated water. Examples of oxidative species include hydrogen peroxide, and oxidative species formed upon decomposition of hydrogen peroxide e.g. hydroxyl and hydroperoxy species, which may also have an antimicrobial effect.

The reaction between hydrogen and oxygen may be conducted at a temperature of from about −20° C. to about 100° C., for example, from about −10° C., to about 80° C., or from about −5° C. to about 50° C., or from about −2° C. to about 25° C., or from about −1 to about 10° C., or from about 0° C. to about 10° C., or from about 1 to about 10° C., or from about 1° C. to about 5° C., or from about 1° C. to about 3° C., or at a temperature of about 0° C., or about 1° C., or about 2° C., or about 3° C., or about 4° C.

The total pressure in the reactor (measured at 20° C.) may vary according to the reaction conditions, amounts of starting materials and the type of reactor. In certain embodiments, the total pressure in the reactor is from about 0.01 to about 15 MPa, for example, from about 0.1 to about 10 MPa, or from about 0.3 to about 4 MPa. In one embodiment, the total pressure in the reactor is 0.3 to 3 MPa, for example, 0.4 to 2 MPa or 0.5 to 1 MPa. In another embodiment, the total pressure in the reactor is 0.7 to 1 MPa.

The contact time with the catalyst may vary according to the reaction conditions and amounts of starting materials and may be adjusted accordingly. In certain embodiments, the reaction time is from about 0.1 seconds to about 10 hours, for example 1 second to 10 minutes.

Any source of hydrogen can be used in the process of this invention. Likewise, any source of oxygen can be employed, including air or pure oxygen. The hydrogen and oxygen-containing gas may be introduced using diluents, for example, nitrogen or carbon dioxide. In a preferred embodiment, hydrogen is produced by electrolysis, for example, in an upstream step and fed to the reactor with air. The air may act as a source of oxygen and a diluent.

In one embodiment, hydrogen is fed to the reactor as a mixture of hydrogen and air. The hydrogen may form less than 10 vol %, preferably less than 5 vol % of the mixture.

In a preferred embodiment, the hydrogen may form 1 to 5 vol % of the mixture. The total pressure of the mixture that is fed to the reactor may be 0.01 to about 15 MPa, for example, from about 0.1 to about 10 MPa, or from about 0.3 to about 4 MPa. In one embodiment, the total pressure in the reactor is 0.3 to 3 MPa, for example, 0.4 to 2 MPa or 0.5 to 1 MPa. In another embodiment, the total pressure in the reactor is 0.7 to 1 MPa.

The ratio of hydrogen to oxygen-containing gas may be 1:10 to 10:1, preferably 1:3 to 3:1, for example 1:2 to 2:1. It may be advisable to employ $H_2$:$O_2$ ratios with appropriate diluent pressure to avoid using explosive mixtures.

As discussed above, the hydrogen and/or oxygen may be produced by electrolysis of water. The wastewater treatment apparatus of the present invention may include an electrolyser that is coupled to the reactor.

Contaminated Water

The process and apparatus of the present invention may be used to treat any contaminated water stream. As described above, the contaminated water stream may be a greywater stream. For example, greywater from domestic, commercial or industrial sources may be treated using the process and apparatus of the present invention.

In an alternative embodiment, the process and apparatus of the present invention may be used as one of many steps of a water treatment or water purification process, for example, a desalination process.

The contaminated water may be contaminated with microbial contaminants, for example, pathogens. The pathogens may be viable, vegetative, planktonic and/or sessile pathogens. The contaminated water may contain biofilm. In one embodiment, the contaminated water contains viable pathogens. Examples of pathogens that may be present include bacteria, viruses, fungi and protozoa. The level of microbial contamination may suitably be measured by quantifying the total viable bacterial load in a given sample. This may be achieved by standard techniques, which are well known in the art, such as, Total Bacterial Count (TBC) (also known as Heterotrophic Plate Count (HPC), Heterotrophic Colony Count (HCC), Aerobic Plate Count (APC), Total Plate Count (TPC), or Standard Plate Count (SPC)). Such methods represent a measure of viable microorganisms present in a sample that could grow aerobically or anaerobically on a suitable medium (e.g. agar) at selected incubation conditions (usually 22° C. and 37° C., for 48 hrs). Depending on the desired final composition of the water sample, useful variations of these methods can suitably comprise, for example, measuring the total amount of viable aerobic and anaerobic bacteria. Furthermore, typically, the presence or quantity of specific indicator organisms may also be assayed, which may include, for example, faecal coliforms, such as *E. coli*. The quantities of bacteria are generally expressed as Colony Forming Units (CFU) per unit sample (e.g. CFU per unit volume). Where the contaminated water sample is contaminated with pathogens, for example including but not limited to bacteria, prior to treatment the water may typically have a total number of viable pathogens (e.g. bacteria) of between $10^1$ CFU/ml to $10^{10}$ CFU/ml. Advantageously, once treated, the water has a CFU/ml that is lower than its starting value. Where the contaminated water sample is contaminated with micro-organisms and/or pathogens, for example bacteria, depending on the total number of viable micro-organisms or pathogens in the untreated sample, treatment of the water sample may reduce the total number of viable micro-organisms or pathogens present in the water sample by at least $10^1$ CFU/ml, at least $10^2$ CFU/ml, at least $10^3$ CFU/ml, at least $10^4$ CFU/ml, at least $10^5$ CFU/ml, at least $10^6$ CFU/ml, at least $10^7$ CFU/ml, at least $10^8$ CFU/ml, at least $10^9$ CFU/ml, at least $10^{10}$ CFU/ml relative to an untreated control sample. The target CFU/ml may vary depending on the end use of the treated water. However, it may be possible to reduce the target CFU/ml of the water to less than 100 CFU/ml, or less than 10 CFU/ml.

Advantageously, where a water sample to be treated is contaminated with micro-organisms and/or pathogens, for example bacteria, treatment of the sample in accordance with the invention may reduce levels of the total amount of viable micro-organisms or pathogens in the sample relative to those of an untreated control sample. In particular, levels of the total amount of viable micro-organisms or pathogens in the treated sample may be reduced with respect to those of an untreated control sample by at least a 2 $\log_{10}$ reduction, for example, at least a 2 $\log_{10}$, at least a 3 $\log_{10}$, at least a 4 $\log_{10}$, at least a 5 $\log_{10}$ or at least a 6 $\log_{10}$ reduction. Levels of the total amount of viable bacteria in the sample may be reduced with respect to those of an untreated control sample by up to a 10 $\log_{10}$ reduction, for example, up to a 10 $\log_{10}$, up to a 9 $\log_{10}$, up to a 8 $\log_{10}$, up to a 7 $\log_{10}$, up to a 6 $\log_{10}$, up to a 5 $\log_{10}$ or up to a 4 $\log_{10}$ reduction.

Advantageously, where a water sample to be treated is contaminated with bacteria, for example *E. coli*, treatment of the sample in accordance with the invention may reduce levels of the total amount of viable bacteria in the sample relative to those of an untreated control sample. In particular, levels of the total amount of viable bacteria in the sample may be reduced with respect to those of an untreated control sample by at least a 2 $\log_{10}$ reduction, for example, at least a 2 $\log_{10}$, at least a 3 $\log_{10}$, at least a 4 $\log_{10}$, at least a 5 $\log_{10}$ or at least a 6 $\log_{10}$ reduction. Levels of the total amount of viable bacteria in the sample may be reduced with respect to those of an untreated control sample by up to a 10 $\log_{10}$ reduction, for example, up to a 10 $\log_{10}$, up to a 9 $\log_{10}$, up to a 8 $\log_{10}$, up to a 7 $\log_{10}$, up to a 6 $\log_{10}$, up to a 5 $\log_{10}$ or up to a 4 $\log_{10}$ reduction. According to preferred aspects of the invention, where a water sample to be treated is contaminated with bacteria, treatment of the sample in accordance with the invention may reduce levels of the total amount of viable bacteria in the water sample by between a 2 $\log_{10}$ to 10 $\log_{10}$ reduction, for example, a 3 $\log_{10}$ to 10 $\log_{10}$ reduction, preferably a 4 $\log_{10}$ to 6 $\log_{10}$ reduction relative to an untreated control sample.

Optionally, where a water sample to be treated is contaminated with micro-organisms and/or pathogens for example bacteria, treatment of the sample in accordance with the invention may reduce the total viable number of a particular target micro-organism or pathogen, for example a particular target bacterium (for example *E. coli*) or of selected indicators (For example, coliforms) in the sample relative to those in an untreated control sample in the same way as described above. Similarly, where a water sample to be treated is contaminated with one or more viruses, treatment of the sample in accordance with the invention may reduce the total number of active, intact or infective virus in the treated sample relative to an untreated control sample in the same way as described above.

In a preferred embodiment, the contaminated water is water that contains viable pathogens, for example, viable culturable and non-culturable pathogens. Once treated, the water may no longer contain viable pathogens, allowing the treated water to be stored for re-use.

Examples of pathogens that may be initially present in the contaminated water prior to treatment may include:

*Vibrio cholera*
hepatitis A virus and other enteroviruses
*Pseudomonas* spp. including *Pseudomonas aeruginosa*
Atypical mycobacteria
coliforms including *Escherichia coli*
*Salmonella* spp.
Protozoa including *Cryptosporidium* spp. *Entamoeba* spp.
*Legionella pneumophilia*
*Staphylococcus aureus* and other Gram-positive bacteria
*Klebsiella pneumoniae*—specific bacteria
*Helicobacter* spp
*Campylobacter* spp In one embodiment, the rate of flow of the contaminated water, hydrogen and/or oxygen-containing gas is controlled at a rate dependent on e.g. the CFU/ml of the contaminated water stream that is introduced via the inlet and/or the treated water stream removed via the outlet of the reactor.

Treated Water

Water that is treated or produced according to the process described herein may be used for a range of applications. The treated water is disinfected and, advantageously, may contain little or substantially no viable pathogens. Accordingly, the treated water may be stored and used for applications including washing, cleaning, irrigation and toilet flushing.

The disinfected water may also be used for healthcare applications, for example, as a diluent for pharmaceutical formulations, for example, topical formulations and cleaning liquids, including contact lens liquids.

In some embodiments, the process of the present invention may be used as a step in a series of water treatment steps to produce e.g. potable water.

EXAMPLES

Example 1—Catalyst Preparation

Au—Pd catalysts were prepared as described below.

For the preparation of 1% Au—Pd supported catalyst, the required amounts of $HAuCl_4 \cdot 3H_2O$ and $PdCl_2/HCl$ solution (HCl concentration: 0.58 M) were charged into a clean 50 mL round-bottom flask, the volume of the solution was adjusted using deionized water to a total volume of 16 mL, and the flask immersed into an oil bath on a magnetic stirrer hot plate. The solution was stirred at 1000 rpm and the temperature of the oil bath was raised from room temperature to 60° C. over a period of 10 min. At 60° C., metal oxide support material [1.98 g $TiO_2$ (Degussa Evonik P25)] was added slowly over a period of 8-10 min with constant stirring. The subsequent slurry was stirred at 60° C. for an additional 15 min. Following this, the temperature of the oil bath was raised to 95° C. for 16 h leaving a dry solid. The solid powder was ground thoroughly to form a uniform mixture. 400 mg of the sample was reduced at 10° C./min under a steady flow of gas (5% $H_2/Ar$) for 4 hours.

Example 2—In Situ Disinfection Results

Reactions were performed in a continuous flow micro reactor. The reactor was constructed using Swagelok components with an internal diameter of ⅛ of an inch. Brooks gas flow controllers control the flow of either 5% $H_2/CO_2$, 25% $O_2/CO_2$ or a combination of $H_2+O_2/CO_2$. Water contaminated with *E. coli* was pumped through the system using an Agilent HPLC pump and the overall pressure of the reactor was controlled with a Swagelok back pressure regulator. The catalyst bed (when present) was submersed in a temperature controlled water bath and pressure gauges were positioned before and after the water bath to monitor pressure drops. Sampling was carried out using a gas liquid separator (GLS) (150 mL) fitted with a valve and positioned before the back pressure regulator. In a typical reaction, 120 mg of catalyst was pelleted (diameter ~425-350 micron) and packed into the micro reactor catalyst bed supported by glass wool. The reactor was typically cooled to 2° C. in the water bath. The system was pressurised to 10 bar (unless otherwise stated) with a $H_2:O_2$ ratio of 1:2 unless otherwise stated. Total gas flows were kept at 42 mL min$^{-1}$ and once the reactor was fully pressurised, solvent was pumped through the system at a rate of 0.2 mL min$^{-1}$.

An initial cell density of $10^7$ CFU/ml was used to perform blank and control experiments using an empty reactor. FIG. 1 shows the observed *E. coli* cell density after one pass through the reactor system under different reaction atmospheres with and without the catalyst present. It was observed that when no catalyst was present and the reactor was operated at 10 bar with a flow of 42 ml min$^{-1}$ of either 5% $H_2/CO_2$, 25% $O_2/CO_2$ or a combination of $H_2+O_2/CO_2$ the cell density decreased from $10^7$ to $10^5$ CFU/ml. The observed decrease of two orders of magnitude from the initial cell density irrespective of the atmosphere used may be due to either the effect of the pressure or the possible acidification of the working solution by dissolved $CO_2$. However, in either case full inactivation of the bacteria was not achieved when no catalyst was present.

Analogous reactions were carried out in the presence of Au—Pd/$TiO_2$ catalyst (120 mg), also shown in FIG. 1. In the presence of $CO_2$ and $H_2$ a further reduction in cell density by an order of magnitude to $10^4$ CFU/ml is achieved relative to the equivalent experiment without catalyst present. This could indicate that the catalyst itself has some intrinsic antibacterial activity which could arise from the presence of Au or Pd nanoparticles. The reaction carried out in the presence of 25% $O_2/CO_2$ further reduced the cell density to $10^3$ CFU/ml which indicates that oxidative environments in the presence of the catalyst are effective for destruction of bacteria.

When the reaction was carried out in the presence of both $H_2$ and $O_2$ no live bacteria were observed in the reaction effluent, even in the undiluted reaction sample, and no $H_2O_2$ was observed in the effluent. This indicates that in situ generated $H_2O_2$ and/or radicals are effective in removing high levels of bacterial contamination, up to $10^7$ CFU/ml, from the water stream (e.g. by generating oxidative species through the activation of $O_2$ and $H_2$ to generate either $H_2O_2$ or subsequent hydroxyl and hydroperoxy species, through the synthesis and decomposition of $H_2O_2$). These reactions were carried out at 10 bar total pressure of the reactant gases. Analogous reactions carried out at 5 bar total pressure with the same gas flow rates showed identical results indicating that there is sufficient $H_2O_2$ produced at this lower pressure to inactivate $10^7$ CFU/ml.

Further experiments shown in FIG. 2 demonstrate that when using 10 bar total pressure and 42 ml min$^{-1}$ total gas flow of 25% $O_2/CO_2$ and 5% $H_2$,$CO_2$ was capable of complete inactivation of $10^9$ CFU/ml from the solution. This highlights the efficiency of the $H_2O_2$ system for the inactivation of bacterial contaminants from a wastewater stream.

By comparing the rate of *E. coli* killing by $H_2O_2$ addition alone with the rate of killing after passing thorough the reactor, even taking the difference in pressure into account, it was observed that reacting $H_2$ and $O_2$ in situ was much more efficient. 100 ppm of added pre-formed $H_2O_2$ takes 60 min to completely eliminate $10^6$ CFU/ml of *E. coli*. The microreactor system employed in this example eliminated all viable bacteria from a $10^9$ CFU/ml solution during the residence time of the liquid passing over the catalysts. This will be of the order of seconds meaning that the in situ approach much more efficient than adding commercially produced $H_2O_2$. This could arise from a number of factors including the difference in stability between stabilized commercial $H_2O_2$ and unstabilized synthesized $H_2O_2$ or the catalytic decomposition of $H_2O_2$ over the catalyst bed during synthesis.

Example 3—Varying Total Pressure

Experiments were then carried out using a gas feed comprising 2% $H_2$/air to simulate a gas feed that could easily be generated by water electrolysis on potential applications sites. To carry out this experiment the $H_2:O_2$ ratio was adjusted from 1:2 to 1:10. It has previously been shown that deviation from a stoichiometric $H_2:O_2$ ratio leads to a decrease in the amount of $H_2O_2$ synthesized. Also the removal of $CO_2$ as a diluent is likely to destabilize the $H_2O_2$ synthesized by removal of the carbonic acid from the working solution. However, in this application the greater instability may be beneficial in generating reactive intermediates. Reactions were carried out at various pressures between 2.5 and 10 bar to investigate if inactivation of *E. coli* could be carried out at lower pressures. FIG. 3a shows that from a starting solution containing $10^7$ CFU of *E. coli* a small degree of inactivation is seen at pressure below 5 bar. At 7.5 and 10 bar total pressure full inactivation is observed. Promisingly, this demonstrates that full inactivation of $10^7$ CFU/ml of *E. coli* can be carried out using a dilute hydrogen feed and synthetic air as diluent. Gas flow rates have also been shown to have marked effects on the disinfection effect (FIG. 3b). At higher gas flow rates, the mass transfer between gas and liquid is increased, but probably more important is the increase in the rate of mass transfer through the liquid layer surrounding the catalyst surface.

Example 4—Comparison of Pre-Formed $H_2O_2$ to In-Situ Disinfection

To compare the efficiency of in situ vs ex situ inactivation of bacteria by $H_2O_2$, reactions were carried out passing solutions containing *E. coli* with various amounts of $H_2O_2$ through the reactor system containing the AuPd catalyst under a pressure of synthetic air. Solutions of *E. coli* and $H_2O_2$ were mixed immediately prior to being pumped into the reactor to minimise any cell death. The results shown in FIG. 4 demonstrate that when solutions containing initial *E. coli* concentrations of ~$10^7$ CFU/ml with 100-200 ppm $H_2O_2$ were passed through the reactor complete inactivation was not observed, with $10^2$-$10^3$ CFU/ml remaining in solution at the exit of the reactor. Starting from a similar concentration by utilising in situ $H_2O_2$ generated from 2% $H_2$ in air full inactivation of viable cells was observed.

Example 5—EPR Spectroscopy of Radicals Formed

In this Example, electron paramagnetic resonance (EPR) spectroscopy was carried out on an aqueous solution containing commercially available hydrogen peroxide as it was passed over an AuPd catalyst. As a comparison, ESR spectroscopy was performed on an aqueous solution containing bubbled hydrogen and oxygen gas as it was passed over an AuPd catalyst. The results are shown in FIG. 5.

In the case of commercial hydrogen peroxide, hydroxyl (.OH) spin trap adducts were observed resulting from the generation of OH or a decomposition of the hydroperoxy (.OOH) spin trap adduct. When using hydrogen gas and oxygen gas, the EPR revealed the presence of a higher concentration of the oxygen based spin trap adducts and also the presence of hydrogen (H.) radicals, which were not observed when using pre-formed hydrogen peroxide. These initial results suggest that, by using hydrogen and oxygen, a greater flux of radical species can be achieved as a result of either generating high local concentrations of hydrogen peroxide which is decomposed, or that radicals are formed in the steps leading to hydrogen peroxide synthesis which are active against the microorganisms that are present. When no catalyst is present, no radical signals are present and the presence of a radical trap within the reaction gases suppresses antimicrobial activity.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A water treatment process comprising:
   contacting contaminated water with a catalyst,
   introducing hydrogen and an oxygen-containing gas into the contaminated water, and
   reacting hydrogen and oxygen at a temperature of from −20° C. to 50° C. in the presence of the catalyst and the contaminated water to generate radical species that react with contaminants in the water, wherein the radical species include hydrogen radicals.

2. The water treatment process as claimed in claim 1, wherein the catalyst comprises a transition metal selected from at least one of palladium, gold and platinum.

3. The water treatment process as claimed in claim 2, wherein the catalyst comprises either (1) palladium and gold or (2) palladium and tin.

4. The water treatment process as claimed in claim 1, wherein the catalyst is supported on a particulate support.

5. The water treatment process as claimed in claim 4, wherein the particulate support is an oxide support.

6. The water treatment process as claimed in claim 1, wherein at least one of the hydrogen-containing gas, the oxygen-containing gas or the hydrogen and oxygen-containing gas is introduced into the contaminated water at a pressure of 0.1 to 1 MPa.

7. The water treatment process as claimed in claim 1, wherein the oxygen-containing gas is selected from oxygen and air.

8. The water treatment process as claimed in claim 1, wherein at least one of (i) the hydrogen, (ii) the oxygen or (iii) the hydrogen and oxygen is produced by electrolysis upstream of the reactor.

9. The water treatment process as claimed in claim 1, wherein the contaminated water is introduced into a reactor containing the catalyst, and hydrogen and oxygen-containing gas are introduced into the reactor and bubbled through the contaminated water present in the reactor.

10. The water treatment process as claimed in claim 9, wherein the contaminated water is continuously introduced into the reactor via an inlet and continuously removed as a treated water stream via an outlet.

11. The water treatment process as claimed in claim 1, wherein the contaminated water contains viable pathogens prior to treatment.

12. The water treatment process as claimed in claim 11, wherein the reaction between hydrogen and oxygen in the presence of the catalyst reduces the concentration of viable pathogens in the water to produce disinfected water.

13. The water treatment process as claimed in claim 1, wherein the contaminated water is greywater, blackwater, river water, seawater or brackish water.

14. A wastewater treatment apparatus comprising:
a reactor containing a catalyst to generate radical species, including hydrogen radicals, by a reaction in the presence of hydrogen and oxygen, wherein the catalyst comprises palladium and gold or palladium and tin,
an inlet for introducing wastewater into the reactor,
an outlet for withdrawing treated water from the reactor, and
a source of hydrogen and an oxygen-containing gas, wherein the source is for introducing hydrogen and an oxygen-containing gas into the wastewater in the reactor.

15. The wastewater treatment apparatus as claimed in claim 14, which comprises an electrolyser.

* * * * *